United States Patent
Zerr et al.

(10) Patent No.: US 10,508,013 B2
(45) Date of Patent: Dec. 17, 2019

(54) METHOD FOR CLEANING AN ON-LOAD TOP CHANGER, AND ON-LOAD TAP CHANGER

(71) Applicant: Maschinenfabrik Reinhausen GmbH, Regensburg (DE)

(72) Inventors: Eduard Zerr, Regensburg (DE); Michael Schmeisser, Regensburg (DE); Sebastian Schmid, Sinzing (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 228 days.

(21) Appl. No.: 15/525,198

(22) PCT Filed: Nov. 25, 2015

(86) PCT No.: PCT/EP2015/077676
§ 371 (c)(1),
(2) Date: May 8, 2017

(87) PCT Pub. No.: WO2016/096356
PCT Pub. Date: Jun. 23, 2016

(65) Prior Publication Data
US 2018/0075984 A1   Mar. 15, 2018

(30) Foreign Application Priority Data

Dec. 16, 2014   (DE) .................. 10 2014 118 715

(51) Int. Cl.
*H01H 1/60*   (2006.01)
*H01H 9/00*   (2006.01)
(Continued)

(52) U.S. Cl.
CPC .............. *B67C 3/283* (2013.01); *G01L 23/32* (2013.01); *H01H 1/36* (2013.01); *H01H 1/60* (2013.01);
(Continued)

(58) Field of Classification Search
CPC .......... H01H 1/36; H01H 1/60; H01H 9/0016; H01H 47/02; H01H 2009/0061; B67C 3/283; G01L 23/32
(Continued)

(56) References Cited

U.S. PATENT DOCUMENTS

| 7,408,275 B2 | 8/2008 | Hernandez |
| 7,482,714 B2 | 1/2009 | Rapant et al. |

(Continued)

FOREIGN PATENT DOCUMENTS

| DE | 151981 A1 | 10/1981 |
| DE | 9216746 U | 5/1994 |

(Continued)

*Primary Examiner* — Zeev V Kitov
(74) *Attorney, Agent, or Firm* — Andrew Wilford (57) ABSTRACT

In a method for cleaning an on-load tap changer (19) in a regulating transformer (20), provision is made for the on-load tap changer (19) to comprise a moving contact (11) and a fixed contact (12); for a cleaning signal to be generated; for the moving contact (11) to be frictionally moved relative to the fixed contact (12) on the basis of the cleaning signal. An on-load tap changer (19) in a regulating transformer (20) comprises: —a moving contact (11) and a fixed contact (12); —a contact drive (17) which is coupled to the moving contact (11); —a control device (18) which is connected to the contact drive (17) and is designed in such a manner that the control device can generate a cleaning signal and can transmit said signal to the contact drive (17); wherein the contact drive (17) is designed in such a manner that the contact drive can frictionally move the moving contact (11)

(Continued)

relative to the fixed contact (12) on the basis of the cleaning signal.

17 Claims, 5 Drawing Sheets

(51) Int. Cl.
 *H01H 47/02* (2006.01)
 *H01H 1/36* (2006.01)
 *B67C 3/28* (2006.01)
 *G01L 23/32* (2006.01)

(52) U.S. Cl.
 CPC .......... *H01H 9/0016* (2013.01); *H01H 47/02* (2013.01); *H01H 2009/0061* (2013.01)

(58) Field of Classification Search
 USPC ........................................................ 360/160
 See application file for complete search history.

(56) References Cited

U.S. PATENT DOCUMENTS

| | | | |
|---|---|---|---|
| 8,993,904 | B2 | 3/2015 | Elick |
| 2006/0028185 | A1 | 2/2006 | Hernandez et al. |
| 2011/0000769 | A1* | 1/2011 | Twibell ................ H01H 9/0016 200/11 TC |
| 2014/0014479 | A1 | 1/2014 | Elick |
| 2016/0133399 | A1 | 5/2016 | Zwirglmaier |
| 2016/0133406 | A1 | 5/2016 | Wrede |

FOREIGN PATENT DOCUMENTS

| | | | | |
|---|---|---|---|---|
| DE | 9216746 | U1 | 5/1994 | |
| GB | 312396 | * | 2/1928 | ............... H01H 1/60 |
| GB | 1557854 | B | 12/1979 | |

* cited by examiner

METHOD FOR CLEANING AN ON-LOAD TOP CHANGER, AND ON-LOAD TAP CHANGER

CROSS REFERENCE TO RELATED APPLICATIONS

This application is the US-national stage of PCT application PCT/EP2015/077676 filed 25 Nov. 2015 and claiming the priority of German patent application 102014118715.6 itself filed 16 Dec. 2014.

FIELD OF THE INVENTION

The invention relates to a method of cleaning an on-load tap changer in a control transformer and to an on-load tap changer in a control transformer.

BACKGROUND OF THE INVENTION

DE 2 815 684 [GB 1,557,854] describes a tap changer for transformers that comprises a tap selector switch with a plurality of fixed contacts for connection with a tapped regulating winding of the transformer, a movable contact for successive selection of the fixed contacts and a changeover switch for switching over the winding connections when a predetermined fixed contact has been selected. This tap changer comprises an interruption device that is actuatable when the other contacts are selected so as to produce a relative movement between the engaged contacts of the changeover switch without switching over the changeover switch.

DE 2 815 684 also explains the following: The transformer can operate over lengthy periods without a larger regulating range being required, for which reason the changeover switch is consequently actuated only rarely. During these lengthy periods the changeover switch conducts current and oxidizing occurs, as a result of which the contact resistance increases. In such cases, the switch can be destroyed by the resulting heat. During each change of the tap, a pinion rotates through 90°. An arm mounted eccentrically thereto allows the changeover switch a slight movement. This movement is not sufficient to actuate the changeover switch, i.e. switch over the contacts, but it is sufficient to clean the contacts. The said changeover switch can be any kind of current-conducting switch, from which it is assumed that it is not frequently actuated in the installation. The switch is usually a reversing switch for reversing the directional sense of the regulating winding relative to the main winding or a coarse/fine switch for switching an additional winding between the regulating winding and the main winding. The contacts of the changeover switch are disturbed or influenced by the described device during each tap change, this being advantageous, but not essential.

However, this permanent relative movement leads to significant shortening of the service life of the changeover switch and, in particular, its contacts.

OBJECT OF THE INVENTION

It is the object of the invention to create a method of cleaning an on-load tap changer that enables a longer service life of the on-load tap changer switch, and an on-load tap changer, the contacts of which are subject to less wear by cleaning.

SUMMARY OF THE INVENTION

According to a first aspect the invention proposes a method of cleaning an on-load tap changer in a control transformer that, in particular, is connected with a current mains, wherein
the on-load tap changer comprises at least one movable contact and at least one fixed contact,
a cleaning signal is generated and
as a function of the cleaning signal the movable contact is moved relative to the fixed contact frictionally and/or tangentially and/or under constant contact.

Through the relative movement taking place frictionally and/or tangentially and/or under constant contact the movable contact and the fixed contact are cleaned.

The proposed method enables cleaning as required, since the cleaning signal can or is generated only when cleaning is actually required, and the relative movement is carried out as a function of the cleaning signal, thus not unconditionally and inevitably when each switching-over takes place, as is the case with the method known from DE 2 815 684 A1. The service life can thereby be significantly extended by comparison with this known method.

The proposed method enables cleaning of the on-load tap changer during operation of the control transformer, thus when the control transformer is connected with an alternating-current power system.

The proposed method additionally makes possible cleaning of the on-load tap changer outside normal operation of the control transformer when this is separated from the alternating-current power system, for example during maintenance or repair.

The relative movement can be carried out in any mode and manner according to need, for example, along at least one predetermined path that can be, for example, linear or arcuate or defined in any other way, and/or at a predetermined speed that can be, for example, constant or variable in predetermined manner in dependence on time, and/or with a predetermined pressing force that can be, for example, constant or variable in dependence on time in a predetermined manner, and/or with a predetermined pressing pressure that can be, for example, constant or variable in dependence on time in a predetermined manner, and/or with a predetermined tangential force that can be, for example, constant or variable in dependence on time in a predetermined manner, and/or in such a way that the movable contact is moved from a first position to a second position different therefrom, or that the movable contact is moved from the first position to the second position and back again to the first position, or that the movable contact is moved at least twice from the first position to the second position and back again. This path, speed, pressing force, pressing pressure and tangential force and these positions are also called, for short, relative movement parameters in the following.

The cleaning signal can be formed in any mode and manner according to need, for example as a binary signal or an ON/OFF signal or as a signal with three or more values. If the cleaning signal is a binary or an ON/OFF signal then, for example, the relative movement can be started and executed as soon as it receives the value ON and/or as long as it has the value ON, and can be stopped or ended or not carried out as soon as it receives the value OFF and/or it has the value OFF.

If the cleaning signal is a signal with three values then, for example, the relative movement can be carried out once or with a predetermined first number of repetitions as soon as it receives the first value, or twice or with a predetermined second number of repetitions as soon as it receives the second value and can be stopped or ended or not carried out as soon as it receives the third value and/or as long as it has the third value.

Alternatively or additionally in this case, for example, the relative movement can be started and carried out with or in correspondence with a predetermined first relative movement parameter or a predetermined first set of relative movement parameters as soon as the cleaning signal receives the first value and/or as long as it has the first value, or with or corresponding with a predetermined second relative movement parameter or a predetermined second set of relative movement parameters as long as it receives the second value and/or as long as it has the second value and can be stopped or ended or not carried out as soon as it receives the third value and/or as long as it has the third value.

It can be provided that:
at least one cleaning parameter is checked prior to generating the cleaning signal; and
generation of the cleaning signal is carried out in dependence on the result of the check.

Thus, for example, the cleaning signal can be generated as soon as at least one of the cleaning parameters reaches or exceeds a predetermined threshold value.

The check can be carried out in any mode and manner according to need, for example in such a way that at least two cleaning parameters are checked and/or at least one combination of at least two cleaning parameters is checked that, for example, can comprise at least one sum and/or at least one difference and/or at least one product and/or at least one quotient and/or at least one other function of any kind of these cleaning parameters. Thus, for example, it can be checked whether a first cleaning parameter is greater than a predetermined first threshold value and a second cleaning parameter is greater than a predetermined second threshold value or whether the first cleaning parameter is equal to or smaller than the first threshold value and the second cleaning parameter is greater than the second threshold value or whether the first cleaning parameter is greater than the first threshold value and the second cleaning parameter is equal to or smaller than the second threshold value or whether the first cleaning parameter is equal to or smaller than the first threshold value and the second cleaning parameter is equal to or smaller than the second threshold value.

It can be provided that
the cleaning signal depends on at least one cleaning parameter.

This dependence can be formed in any mode and manner as required, for example as a linear, square or exponential function or as a Heaviside function. Thus, for example, the cleaning signal can receive a first predetermined value if at least one of the cleaning parameters is greater than a predetermined threshold value and a second predetermined value if at least one of the cleaning parameters is equal to or smaller than the threshold value.

Preferably, at least one of the cleaning parameters indicates the actual and/or estimated degree of contamination of the movable contact and/or the fixed contact and/or the necessity of cleaning.

It can be provided that
at least one of the cleaning parameters is
a first time period corresponding to how long the movable contact has been conducting current without interruption or
a second time period corresponding to how long the movable contact has been conducting current since its last cleaning or
a third time period corresponding to how long the fixed contact has been conducting current without interruption or
a fourth time period corresponding to how long the fixed contact has been conducting current since its last cleaning or
a fifth time period corresponding to how long the movable contact has been free of current without interruption or
a sixth time period corresponding to how long the movable contact has been free of current since its last cleaning or
a seventh time period corresponding to how long the fixed contact has been free of current without interruption or
an eighth time period corresponding to how long the fixed contact has been free of current since its last cleaning or
a ninth time period corresponding to how long the movable contact free of current has contacted the fixed contact without interruption or
a tenth time period corresponding to how long the movable contact has not contacted the fixed contact or
a resistance value corresponding to how large the electrical contact resistance between the fixed contact and the movable contact connected therewith is.

The electrical contact resistance is a measure of the electrical losses when current flows through the electrical contact area between the fixed contact and the movable contact connected therewith.

It can be provided that
prior to the checking a switching signal is generated for actuating the on-load tap changer and, in particular, the actuation of the on-load tap changer is interrupted;
the checking is carried out as a function of the switching signal; and
after the cleaning the on-load tap changer is actuated as a function of the switching signal.

The checking is preferably carried out as a function of the switching signal in that the checking is carried out as soon as the switching signal is generated.

Alternatively or additionally the checking is carried out as a function of the switching signal in that the kind of check depends on the switching signal, as explained in more detail in the following.

The switching signal is usually generated so as to switch the on-load tap changer from a first, instantaneous setting corresponding with a first translation ratio of the control transformer to a second, desired setting corresponding with a second translation ratio of the control transformer. In a first case, the movable contact can, for example, be connected with the fixed contact in accordance with a corresponding first switching signal in the first setting and conduct current and can remain connected with the fixed contact and be free of current in the second setting. In a second case, the movable contact can, for example, be connected with the fixed contact in accordance with a corresponding second switching signal in the first setting and be free of current and can remain connected with the fixed contact in the second setting and conduct current. The checking can then be carried out in the first case in such a manner, for example, that a cleaning parameter—which is the first time period—is checked and in a second case in such a manner that a cleaning parameter—which is the fifth time period—is checked. Consequently, the form of checking and thus the checking take place as a function of the switching signal.

It can be provided that
the on-load tap changer comprises a load changeover switch and a fine selector that comprises the movable contact and the fixed contact; and
actuation of the on-load tap changer is carried out in such a way that initially the movable contact is connected with the fixed contact or remains connected with the fixed contact and that then the load changeover switch is actuated.

It can be provided that
the movable contact and/or the fixed contact is or are part of a load selector, fine selector, coarse tap selector, reverser or preselector in the on-load tap changer.

It can be provided that
the fixed contact is constructed as a tap contact or diverter contact.

It can be provided that
during the frictional movement the movable contact is not detached from the fixed contact.

It can be provided that
before and/or after the frictional movement the movable contact is detached at least once from the fixed contact.

It can be provided that
the frictional movement is carried out in such a way that the movable contact is detached at least once from the fixed contact.

It can be provided that
the control transformer is connected with an alternating-current power system; and/or
during the method or during the cleaning the control transformer is not separated from an alternating-current power system or is or remains connected with an alternating-current power system; and/or
during generation of the cleaning signal and/or during movement of the movable contact and/or during checking of the cleaning parameter the control transformer is not separated from an alternating-current power system or is or remains connected with an alternating-current power system.

The method can thus be carried out, for example, during operation of the control transformer.

It can be provided that
the control transformer is not connected with an alternating-current power system; and/or
prior to generation of the cleaning signal or prior to movement of the movable contact or prior to checking of the cleaning parameter the control transformer is separated from an alternating-current power system or is not connected with an alternating-current power system.

The method can thus be carried out, for example, outside the normal operation of the control transformer, for example when this is separated from the alternating-current power system during maintenance or repair.

According to a second aspect the invention proposes an on-load tap changer in a control transformer, connected with, in particular, a current mains, the tap changer comprising
a movable contact and a fixed contact;
a contact drive coupled to the movable contact; and
a controller connected with the contact drive and so constructed that it
can generate a cleaning signal and transmit it to the contact drive;

wherein
the contact drive is so constructed that it can frictionally move the movable contact relative to the fixed contact as a function of the cleaning signal.

It can be provided that
the controller is so constructed that it
can check at least one cleaning parameter prior to generation of the cleaning signal; and
can undertake generation of the cleaning signal in dependence on the result of the check.

It can be provided that
the controller is so constructed that it
can generate the cleaning signal in dependence on at least one of the cleaning parameters.

It can be provided that
at least one of the cleaning parameters is
a first time period corresponding to how long the movable contact has been conducting current without interruption or
a second time period corresponding to how long the movable contact has been conducting current since its last cleaning or
a third time period corresponding to how long the fixed contact has been conducting current without interruption or
a fourth time period corresponding to how long the fixed contact has been conducting current since its last cleaning or
a fifth time period corresponding to how long the movable contact has been free of current without interruption or
a sixth time period corresponding to how long the movable contact has been free of current since its last cleaning or
a seventh time period corresponding to how long the fixed contact has been free of current without interruption or
an eighth time period corresponding to how long the fixed contact has been free of current since its last cleaning or
a ninth time period corresponding to how long the movable contact free of current has contacted the fixed contact without interruption or
a tenth time period corresponding to how long the movable contact has not contacted the fixed contact or
a resistance value corresponding to how large the electrical contact resistance between the fixed contact and the movable contact connected therewith is.

It can be provided that
the controller is so constructed that it can
prior to the check generate a switching signal for actuating the on-load tap changer;
carry out the check as a function of the switching signal;
after the cleaning actuate the on-load tap changer as a function of the switching signal.

Preferably, after generation of the switching signal the actuation of the on-load tap changer is interrupted until the cleaning has ended.

It can be provided that each of the proposed on-load tap changers comprises
a load changeover switch and a fine selector that comprises the movable contact and the fixed contact;
wherein
the controller is so constructed that for actuation of the on-load tap changer it initially activates the contact drive in such a way that this connects the movable contact with the fixed contact or leaves it connected with the fixed contact and then activates the load changeover switch in such a way that this switches over.

Preferably, the contact drive is constructed in such a way that it connects the movable contact with the fixed contact or leaves it connected with the fixed contact.

It can be provided that the movable contact and/or the fixed contact is or are part of a load selector, fine selector, coarse tap selector, reverser or preselector in the on-load tap changer.

It can be provided that the fixed contact is constructed as a tap contact or diverter contact.

It can be provided that the contact drive is so constructed that it cannot detach the movable contact from the fixed contact during the frictional movement; and/or can detach the movable contact from the fixed contact at least once before and/or after the frictional movement.

It can be provided that the contact drive is so constructed that it can undertake the frictional movement in such a way that the movable contact detaches from the fixed contact at least once.

The statements and explanations with respect to one of the aspects of the invention, particularly the individual features of this aspect, also apply analogously to the other aspects of the invention.

BRIEF DESCRIPTION OF THE DRAWING

Embodiments of the invention are explained in more detail in the following by way of example with reference to the accompanying drawings. However, the individual features evident therefrom are not restricted to the individual forms of embodiment, but can be connected and/or combined with individual features described further above and/or with individual features of other forms of embodiment. The details in the drawings are to be understood as merely explanatory and not limitative. The reference numerals included in the claims are not to restrict the scope of the protection of the invention in any way, but refer merely to the forms of embodiment shown in the drawings. Therein:

SPECIFIC DESCRIPTION OF THE INVENTION

Figure 1:
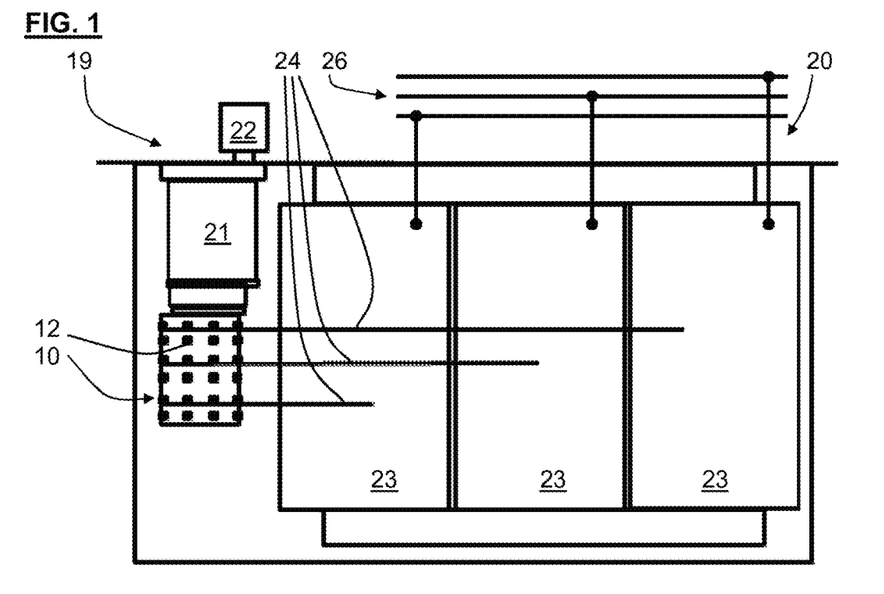
FIG. 1 shows a first embodiment of an on-load tap changer in a control transformer.

A first embodiment of an on-load tap changer 19 in a control transformer 20 that is connected with an alternating-current power system 26, is schematically illustrated in FIG. 1.

Figure 3:
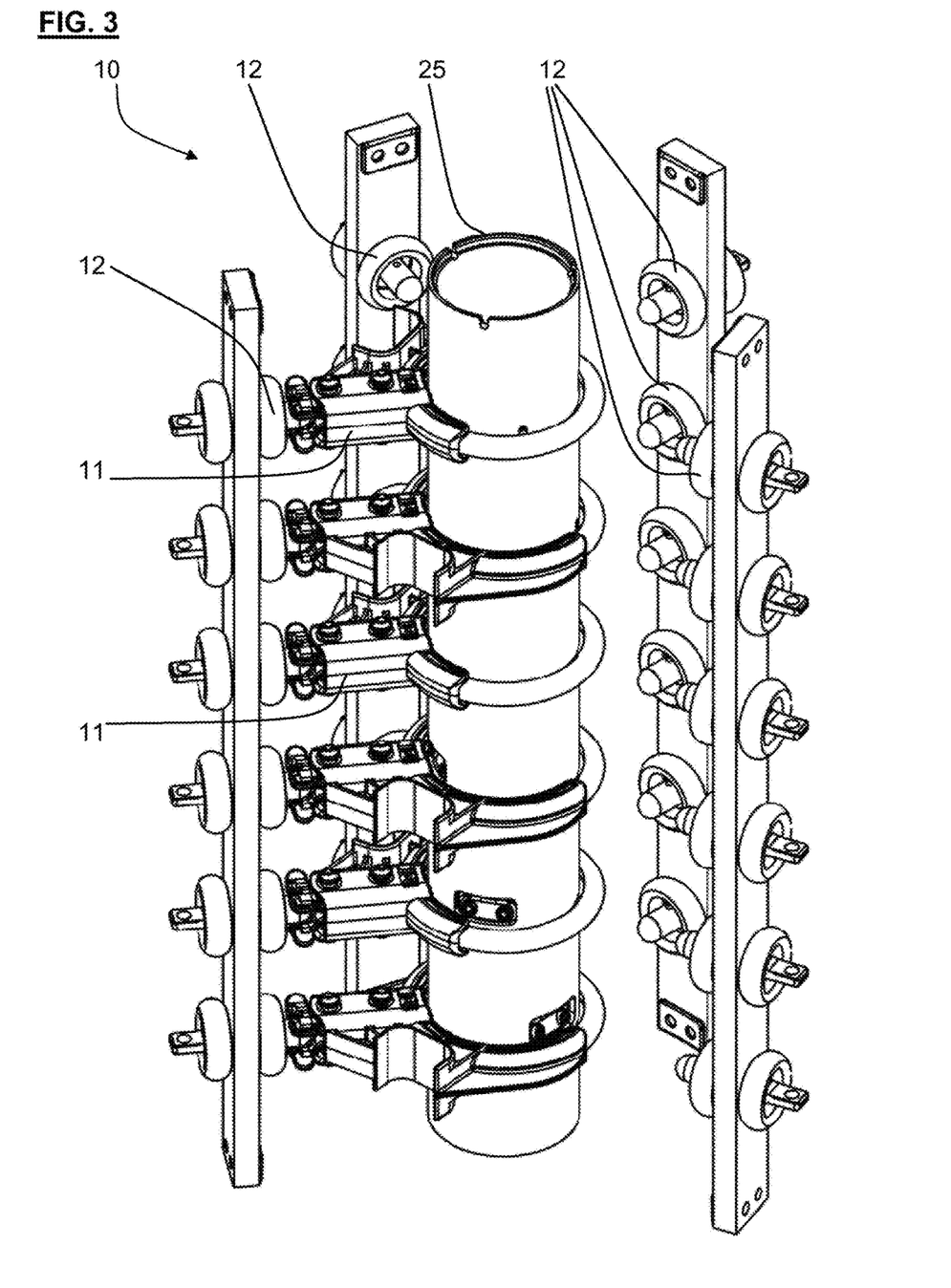
FIG. 3 shows a preferred embodiment of a fine selector with fixed contacts and movable contacts according to a first embodiment.
Figure 4:
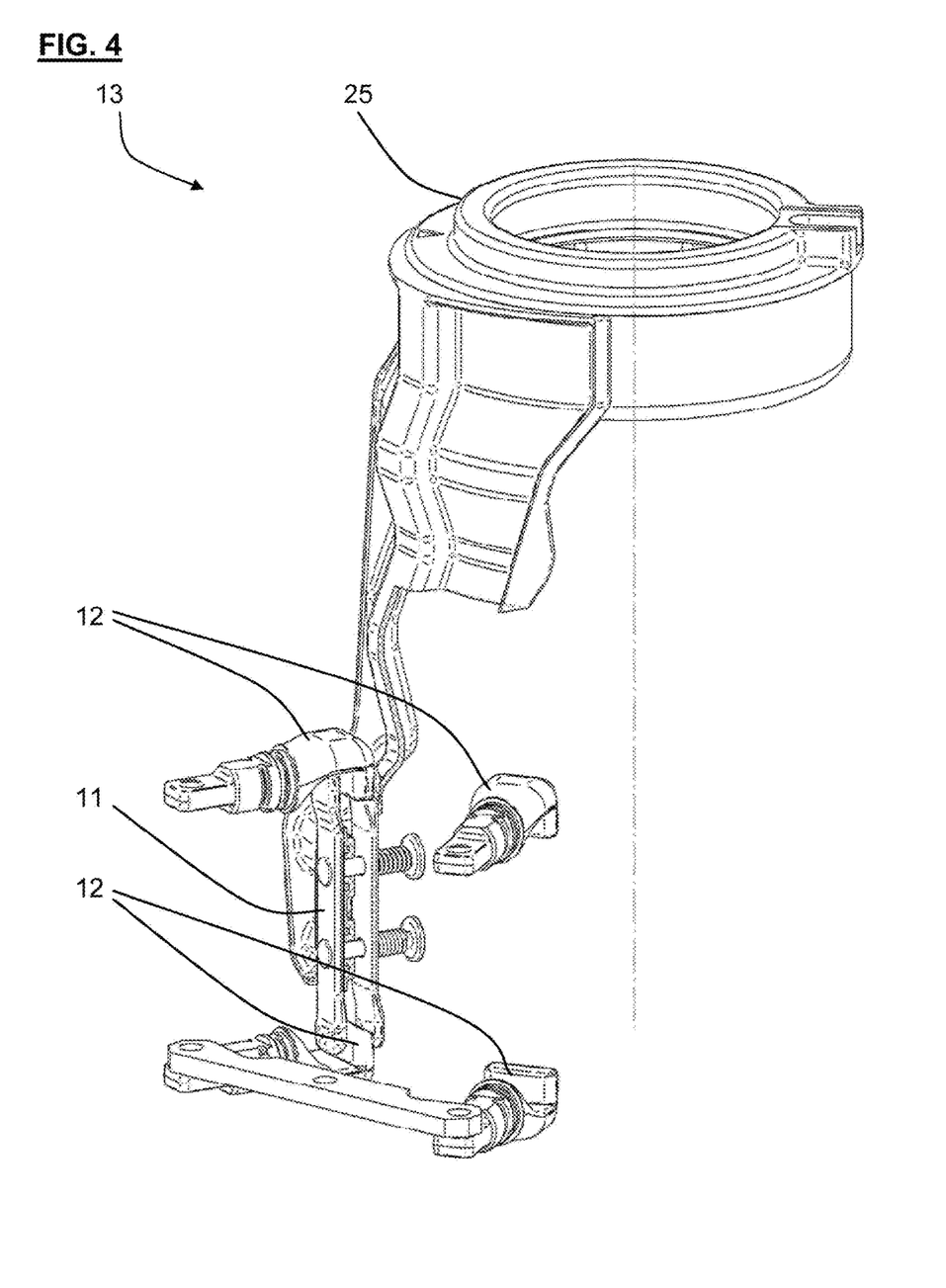
FIG. 4 shows a preferred embodiment of a preselector with fixed contacts and movable contacts according to a second embodiment.
Figure 5:
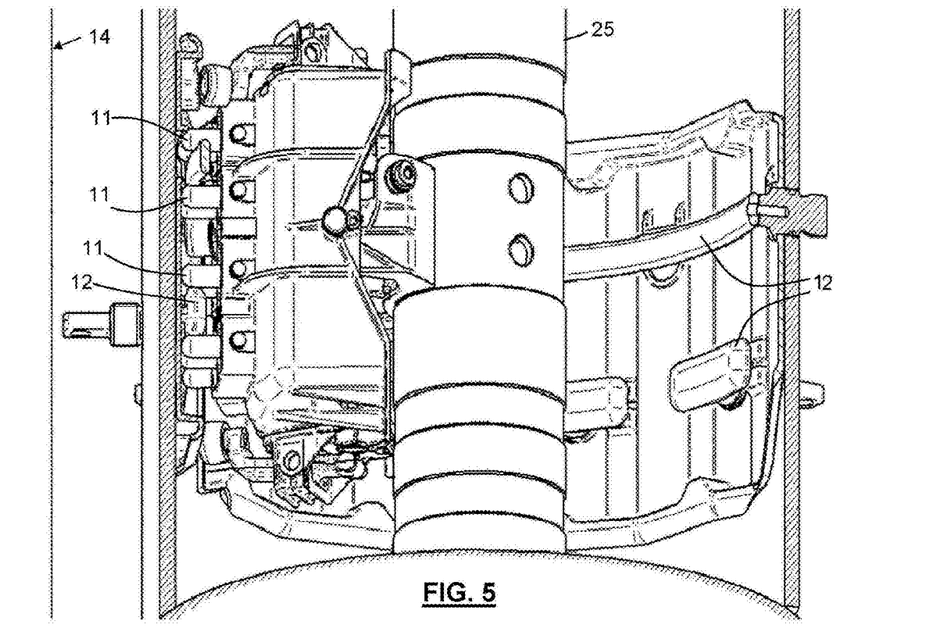
FIG. 5 shows a preferred embodiment of a load selector with fixed contacts and movable contacts according to a third embodiment.

The on-load tap changer 19 in this embodiment comprises, for example, a fine selector 10, a load changeover switch 21 and a drive device that comprises a motor 22 and a drive train (not illustrated) with a switching shaft 25 (FIG. 3, FIG. 4, FIG. 5). The control transformer 20 is, by way of example, of three-phase design and has for each phase a main winding (not illustrated) and a regulating winding 23 with a plurality of taps (not illustrated). The fine selector 10 comprises a plurality of movable contacts 11 (FIG. 3) and a plurality of fixed contacts 12, each of which is electrically conductively connected with a tap as indicated schematically in FIG. 1 by the lines 24. The drive train is coupled at one end with the motor 22 and at the other end with the fine selector 10 and the load changeover switch 21.

Figure 2:
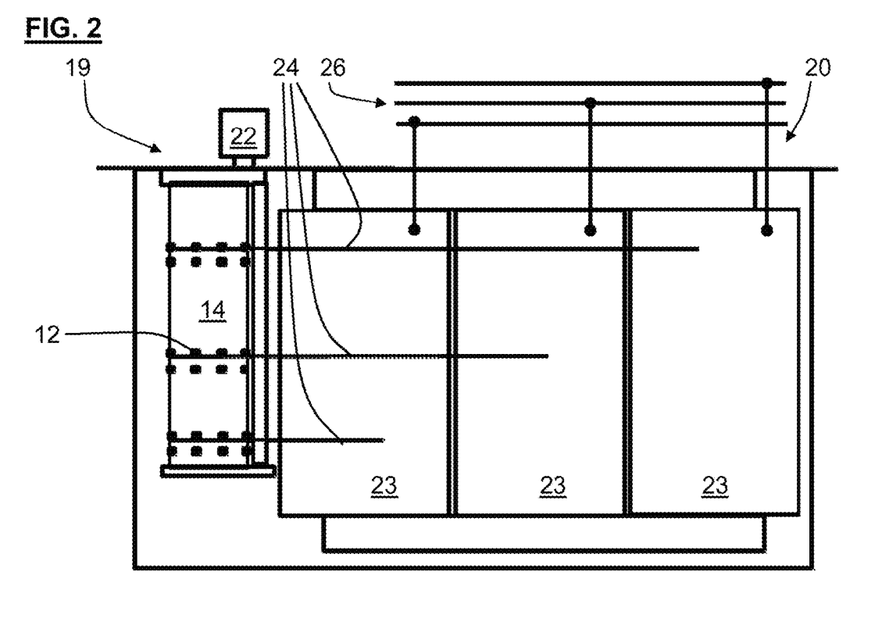
FIG. 2 shows a second embodiment of the on-load tap changer in the control transformer.

A second embodiment of the on-load tap changer 19 in the control transformer 20 is schematically illustrated in FIG. 2. This embodiment is similar to the first embodiment, so that in the following primarily the differences are explained in more detail.

The on-load tap changer 19 in this embodiment comprises, by way of example, a load selector 14 instead of the fine selector 10 and load changeover switch 21. Accordingly, the drive train is coupled to the load selector 14. The load selector 14 comprises a plurality of movable contacts 11 (FIG. 5) and a plurality of fixed contacts 12, each of which is electrically conductively connected with a tap as schematically illustrated in FIG. 2 by the lines 24.

Each on-load tap changer 19 can, according to need, comprise a preselector 13 (FIG. 4) coupled with the drive train. The preselector 13 can, for example, be constructed as a reverser that selectably connects each main winding with one of the ends of the respective regulating winding 23 or as a coarse tap selector that selectably connects a part of each main winding with the rest of the respective main winding or bridges over it.

A preferred embodiment of the fine selector 10 is schematically illustrated in FIG. 3.

In this embodiment the fine selector 10 comprises, by way of example, a plurality of movable contacts 11 that are fastened to a switching shaft 25 and that are constructed in accordance with a first embodiment, and a plurality of fixed contacts 12 that are constructed in accordance with a first embodiment and each of which is electrically conductively connected with a tap.

The fine selector 10 serves for power-free, current-free or load-free preselection of one of the fixed contacts 12 that is electrically conductively connected with that tap to be switched over to. The load changeover switch 21 serves for the actual switching over, which takes place after the preselection, under load from the instantaneous current-conducting fixed contact 12 connected with a movable contact 11 to the preselected fixed contact 12 to be switched over to.

Prior to the switching over, a movable contact 11 is thus connected with a fixed contact 12 during the preselection. In that case, preferably prior to the preselection a cleaning signal is generated in dependence on at least one cleaning parameter and cleaning of the preselected fixed contact 12 to be connected is carried out as a function of the cleaning signal. Thus, for example, the switching shaft 25 and therewith the movable contact 11 can be controlled by a cleaning signal in such a way that the fixed contact 12 is moved to at least once by the movable contact 11 when the fixed contact 12 has not been connected for a lengthy period of time. Contaminations are removed from fixed contact 12 by these frictional relative movements. If, however, the fixed contact 12 was connected only briefly, cleaning is not carried out and the fixed contact 12 is moved to directly by the movable contact 11.

Contamination of the fixed contacts 12 and the movable contacts 11 occurs often in the form of foreign layer formation by the oil constituents and the oil decomposition products that arise due to thermal effects.

A preferred embodiment of the preselector 113 is schematically illustrated in FIG. 4. The preselector 13 is of three-phase construction, but in FIG. 4 merely a 120° segment that is associated with one of the three phases is shown.

The preselector 13 in this embodiment is thus constructed, by way of example, as described in DE 10 2013 107 549 [US 2016/0133399].

In this embodiment the preselector 13 comprises, by way of example, for each phase a movable contact 11 that is fastened to a switching shaft 25 and that is constructed in accordance with a second embodiment, and a plurality of fixed contacts 12 that are constructed in accordance with a second embodiment. Here, too, by way of example the switching shaft 25 and thus the movable contact 11 can be controlled by a cleaning signal in such a way that the movable contact 11—before it is switched over to a fixed contact 12—cleans this if necessary by at least one frictional relative movement.

A preferred embodiment of a load selector 14 is schematically illustrated in FIG. 5.

The load selector 14 in this embodiment is thus constructed as is described in DE 10 2013 107 550 [US 2016/0133406].

In this embodiment the load selector 14 comprises, by way of example, a plurality of movable contacts 11 that are fastened to a switching shaft 25 and that are constructed in accordance with a third embodiment, and a plurality of fixed contacts 12 that are constructed in accordance with a second embodiment.

The load selector 14 serves for selection and switching-over under load in a sliding motion from the instantaneous current-conducting fixed contact 12 that is connected with a movable contact 11, to that fixed contact 12 that is to be switched over to, without a power-free, current-free or load-free preselection taking place beforehand.

When switching over takes place, a movable contact 11 is thus connected under load with a fixed contact 12. In that case, a cleaning signal is generated in dependence on at least one cleaning parameter, preferably prior to the switching over, and cleaning of the instantaneous current-conducting connected fixed contact 12 is carried out as a function of the cleaning signal. Thus, for example, the switching shaft 25 and therewith the movable contact 11 can be controlled by the cleaning signal in such a way that the movable contact 11 is frictionally moved relative to the fixed contact 12 without detaching therefrom. Contaminations are removed from the fixed contact 12 by these frictional relative movements.

This is necessary when, for example, the instantaneously connected fixed contact 12 conducts current without interruption over a longer period of time. Due to the constantly flowing current, the fixed contact 12 and movable contact 11 may be heated to a particularly significant extent, so that oil constituents and oil decomposition products can cause contamination, oxidation and/or corrosion of the contacts 11, 12.

Figure 6:
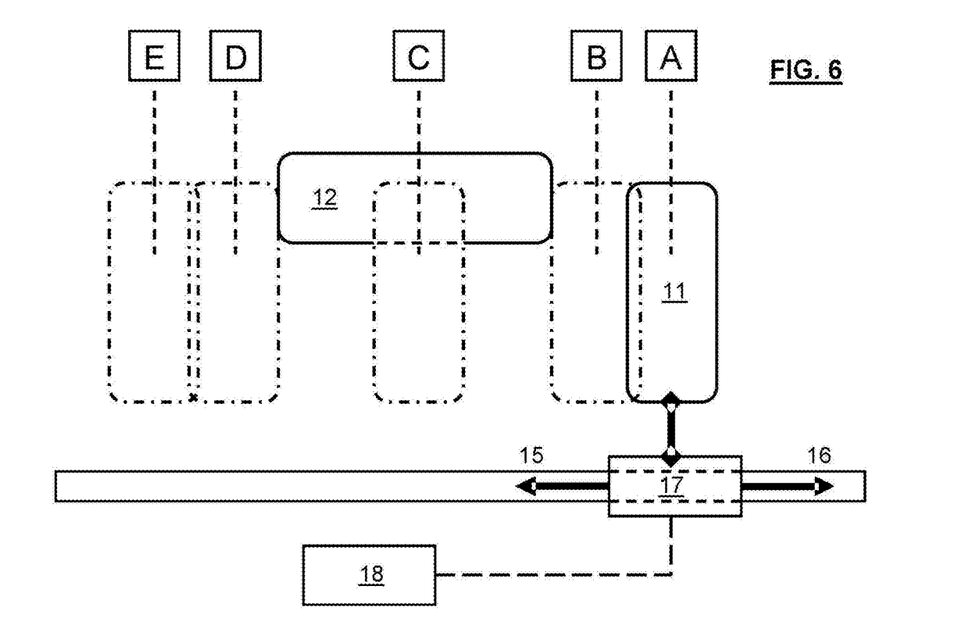
FIG. 6 shows a fourth embodiment of a fixed contact and a movable contact.

A part of the fine selector 10, the preselector 13 or the load selector 14 is schematically illustrated in FIG. 6. This part comprises a fixed contact 11 constructed in accordance with a fourth embodiment, a movable contact 12 constructed in accordance with a fourth embodiment, a contact drive 17 and a controller 18. By way of example, the contact drive 17 comprises a rail and a slide that is movably mounted on the rail and is coupled with the movable contact 11 and the motor 22 (FIG. 1, FIG. 2). The controller 18 is connected with the contact drive 17 and/or with the motor 22 and is constructed in such a way that it can generate a cleaning signal and transmit it to the contact drive 17 and/or motor 22. The contact drive 17 and/or the motor 22 is or are constructed in such a way that it or they can frictionally move the movable contact 11 relative to the fixed contact 12 as a function of the cleaning signal.

The cleaning of the fixed contact 12 is described in more detail in the following.

Initially, the movable contact 11 is in a position A in which it does not contact the fixed contact 12. For cleaning, the controller 18 generates the cleaning signal and transmits it to the contact drive 17 and/or the motor 22. The contact drive 17 thereupon moves the movable contact 11 in a first direction that is shown by the arrow 15. A frictional movement begins and/or takes place already when the movable contact 11 reaches and/or goes beyond a position B in which it contacts, by its lower side facing into the plane of the drawing, the fixed contact 12 at the upper side thereof facing out of the plane of the drawing. The contact drive 17 then moves the movable contact 11 beyond the position B further in the direction 15 into a position C that, for example, lies in the middle of the fixed contact 12. After reaching the position C, the contact drive 17 can, for example, move the movable contact 11 further in the first direction 15 until in a position D, in which it detaches from the fixed contact 12 and/or just still contacts this, and optionally further into a position E, in which it does not contact the fixed contact 12, or can move it in the direction—shown by the arrow 16—opposite to the first direction 15 back to the position B in which it detaches from the fixed contact 12 and/or just still contacts this. The contact made on the first occasion and resulting frictional movement can already clean the fixed contact 12. However, this movement can be repeated as many times as desired according to need.

After the conclusion of the cleaning, the contact drive 17 can move the movable contact 11 into, for example the position A or E and keep it there so that it does not contact the fixed contact 12. However, the contact drive 17 can also move the movable contact 11 into, for example, the position B or D or between these, preferably into the position C, and keep it there so that it contacts the fixed contact 12.

A further possibility for generation of the frictional movement can be realized in that the contact drive 17 moves the movable contact 11 back and forth between the positions B and D alternately in the first direction 15 and the second direction 16. In that case the movable contact 11 and the fixed contact 12 remain constantly in contact. The contact drive 17 can also drive the movable contact 11 in such a way that it executes micro-movements about the position C.

The frictional movement in which the movable contact 11 and the fixed contact 12 are in contact enables cleaning in operation of the on-load tap changer, for example at a movable contact 11 that is connected or not connected, of the fine selector 10, preselector 13 or load selector 14.

Figure 7:
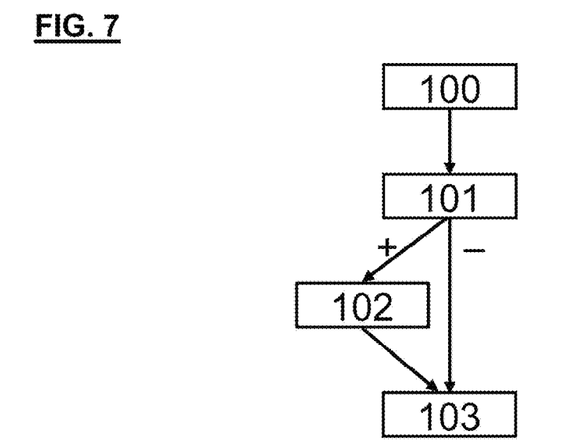
FIG. 7 shows a first embodiment of a method of cleaning the on-load tap changer.

A first embodiment of a method of cleaning the on-load tap changer 19 is schematically illustrated in FIG. 7.

In this embodiment the on-load tap changer 19 comprises the load changeover switch 21 and the fine selector 10 of FIG. 3 and the method comprises, for example, the following steps:

Step 100: switching signal for actuation of the on-load tap changer

Step 101: checking a cleaning parameter

Step 102: generating a cleaning signal and cleaning

Step 103: actuating the on-load tap changer.

A switching signal for actuating the on-load tap changer 19 is generated in Step 100. This switching signal is generated by, for example, a voltage regulator that has the task of keeping the primary voltage or the secondary voltage of the control transformer 20 within a predetermined voltage range. In the case of an on-load tap changer 19 comprising a load changeover switch 21 and a fine selector 10, the power-free, current-free or load-free preselection of one of the fixed contacts 12 that is electrically conductively connected with the tap to be switched over to, is carried out with the help of the fine selector 10 and the actual switching-over under load in the load changeover switch 21. In this embodiment the switching signal contains, for example, data about which movable contact 11 of the fine selector 10 is to be moved and which fixed contact 12 of the fine selector 20 is to be connected by this movable contact 11 to be moved.

After Step 100, a cleaning parameter is checked in Step 101 so that checking is carried out in dependence on the switching signal. In this embodiment the cleaning parameter is, for example, a time period corresponding to how long that movable contact 11 that is to be moved in accordance with the switching signal has not been connected with or contacted or touched that fixed contact 12 that is to be connected in accordance with the switching signal. By way of example, in this embodiment it is investigated, for the checking, whether the cleaning parameter has exceeded a predetermined threshold value. For the YES case (indicated in FIG. 7 by the plus sign '+'), if thus the cleaning parameter has exceeded the threshold value, Step 102 is executed and for the NO case (indicated in FIG. 7 by the minus sign '−'), if thus the cleaning parameter has not exceeded the threshold value, Step 103 is executed.

In Step 102 initially a cleaning signal is generated. The cleaning signal in this embodiment contains, for example, data about how often and in which sequence the movable contact 11 that is to be moved in accordance with the switching signal, shall move to the positions A to E of FIG. 6 referred to the fixed contact 12 that is to be connected in accordance with the switching signal. After generation of the cleaning signal, the movable contact 11 is moved in correspondence with this data and consequently moved as a function of the cleaning signal relative to the fixed contact 12 so that the cleaning is carried out. The cleaning parameter is then reset to zero and Step 103 executed.

In Step 103 the on-load tap changer 19 is actuated in correspondence with the switching signal and switching-over of the on-load tap changer 19 is carried out.

Since Step 102 is executed for the YES case and consequently the cleaning signal is generated and Step 102 is not executed for the NO case and consequently the cleaning signal is not generated, the cleaning signal is generated in dependence on the result of the check.

Figure 8:
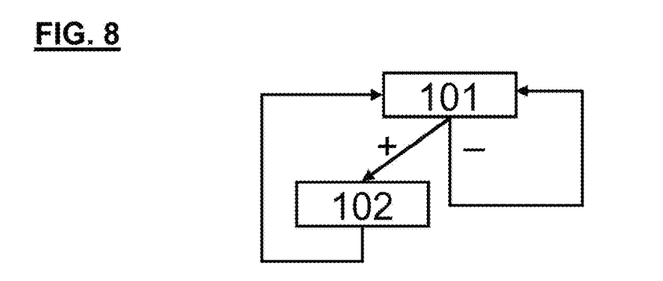
FIG. 8 shows a second embodiment of the method.

A second embodiment of the method of cleaning the on-load tap changer 19 is schematically illustrated in FIG. 8.

This embodiment is similar to the first embodiment so that in the following primarily the differences are described in more detail.

In this embodiment the on-load tap changer 19 comprises the load selector 14 of FIG. 5 and the method comprises, for example, the following steps:

Step 101: checking of a cleaning parameter

Step 102: generation of a cleaning signal and cleaning

Thus, by contrast to the first embodiment the Steps 100 and 103 are eliminated.

The cleaning parameter in this embodiment is, by way of example, a time period corresponding to how long the instantaneous current-conducting fixed contact 12 conducts current without interruption. In this embodiment, for checking it is, for example, checked in Step 101 whether the cleaning parameter has exceeded a predetermined threshold value. For the YES case (indicated in FIG. 8 by the plus sign '+'), if thus the cleaning parameter has exceeded the threshold value, Step 102 is executed and for the NO case (indicated in FIG. 8 by the minus sign '−'), thus if the cleaning parameter has not exceeded the threshold value, Step 101 is executed after a predetermined pause.

In this embodiment the cleaning signal generated in Step 102 contains, for example, data about how often and how far the instantaneous current-conducting movable contact 11 that is connected with the instantaneous current-conducting fixed contact 12 and currently adopts the position C of FIG. 6 relative thereto, is to be moved starting from the position C in the first direction 15 and the second direction 16 without, however, reaching the positions B and D, so that it remains constantly in contact with the fixed contact 12. After generation of the cleaning signal the movable contact 11 is moved in correspondence with these data and consequently frictionally moved as a function of the cleaning signal relative to the fixed contact 12 so that the cleaning is carried out. The cleaning parameter is then reset to zero and Step 101 is executed after a predetermined pause.

Figure 9:
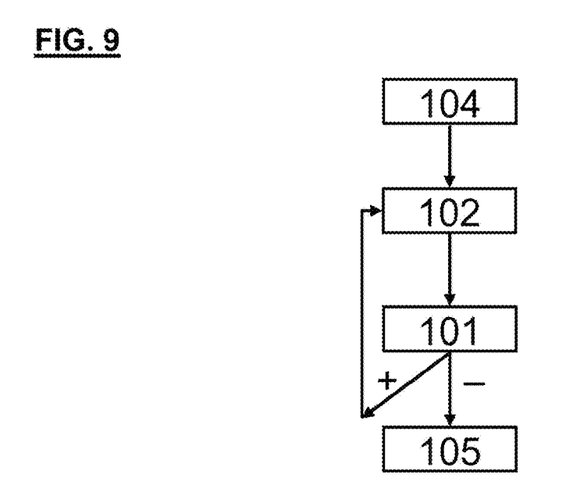
FIG. 9 shows a third embodiment of the method.

A third embodiment of the method of cleaning the on-load tap changer 19 is schematically illustrated in FIG. 9. This embodiment is similar to the second embodiment so that primarily the differences are described in more detail in the following.

In this embodiment the on-load tap changer 19 comprises the load changeover switch 21 and the fine selector 10 of FIG. 3 and the method comprises, for example, the following steps:

Step 104: separating the control transformer 20 from the alternating-current power system 26

Step 102: generating a cleaning signal and cleaning

Step 101: checking of cleaning parameters

Step 105: end of the method.

Prior to maintenance or repair, the control transformer 20, in which the on-load tap changer 19 is installed, is usually separated from the alternating-current power system 26 in a Step 104. Thereafter, in Step 102 cleaning of the on-load tap changer 19 by the proposed method can be carried out. For that purpose, in the simplest embodiment cleaning can be carried out in such a way that each movable contact 11 individually moves several times to each of the fixed contacts 12 associated therewith and is connected with that at least once. Through these relative movements, contaminations are removed from the fixed contacts 12 and also from the movable contacts 11. In that case the cleaning can be carried out without a check of cleaning parameters of any kind.

In order to check the cleaning effect, Step 101 is carried out after the cleaning. In Step 101 the resistance values of the electrical contact resistances between each movable contact 11 and each of the fixed contacts 12 associated therewith are determined as cleaning parameter and it is checked whether one of the cleaning parameters has exceeded a predetermined threshold value. For the YES case (indicated in FIG. 9 by the plus sign '+') Step 102 is carried out and for the NO case (indicated in FIG. 9 by the minus sign '−') Step 105 is carried out.

The method is concluded in Step 105 and, for example, an end signal is generated.

It is also possible to clean only those fixed contacts 12 of which the resistance value was too high. The movable contact 11 can then individually move to and clean the relevant fixed contacts 12. Here, too, Step 101 can be subsequently repeated.

Moreover, the cleaning parameters can be data that are detected during operation, such as, for example, the already mentioned time periods. These can express, for example, which fixed contacts 12 since a specific time period were not connected or were current-conducting for a specific time period and consequently should be cleaned.

The invention claimed is:

1. A method of cleaning an on-load tap changer in a control transformer, where the on-load tap changer comprises a movable contact and a fixed contact, the method comprising the steps of sequentially:
generating a switching signal for actuating the on-load tap changer;
thereafter checking at least one cleaning parameter; and
thereafter generating a cleaning signal as a function of the switching signal and in a manner depending on the result of the checking of the one cleaning parameter;
thereafter rubbing the movable contact against the fixed contact in a manner determined by the cleaning signal; and
thereafter actuating the on-load tap changer as a function of the switching signal.

2. The method according to claim 1, wherein
at least one of the cleaning parameters is
a first time period corresponding to how long the movable contact has been conducting current without interruption or
a second time period corresponding to how long the movable contact has been conducting current since its last cleaning or
a third time period corresponding to how long the fixed contact has been conducting current without interruption or
a fourth time period corresponding to how long the fixed contact has been conducting current since its last cleaning or
a fifth time period corresponding to how long the movable contact has been free of current without interruption or
a sixth time period corresponding to how long the movable contact has been free of current since its last cleaning or
a seventh time period corresponding to how long the fixed contact has been free of current without interruption or
an eighth time period corresponding to how long the fixed contact has been free of current since its last cleaning or
a ninth time period corresponding to how long the movable contact free of current has contacted the fixed contact without interruption or
a tenth time period corresponding to how long the movable contact has not contacted the fixed contact or
a resistance value corresponding to the level of electrical contact resistance between the fixed contact and the movable contact connected therewith.

3. The method according to claim 1, wherein
the on-load tap changer comprises a load changeover switch and a fine selector that comprises the movable contact and the fixed contact, the method further comprising the step of:
actuating the on load tap changer such that initially the movable contact is connected with the fixed contact or remains connected with the fixed contact and that then the load changeover switch is actuated.

4. The method according to claim 1, wherein the movable contact or the fixed contact is part of a load selector, fine selector, coarse tap selector, reverser or preselector in the on-load tap changer.

5. The method according to claim 1, wherein the fixed contact is a tap contact or diverter contact.

6. The method according to claim 1, wherein
during rubbing the movable contact is not separated from the fixed contact.

7. The method according to claim 1, further comprising the step of:
before or after rubbing separating the movable contact at least once from the fixed contact.

8. The method according to claim 1, wherein
the rubbing is carried out in such a way that the movable contact is separated at least once from the fixed contact.

9. The method according to claim 1, further comprising the step of:
during generation of a cleaning signal or during rubbing of the movable contact or during checking of the cleaning parameter, connecting the control transformer with an alternating-current power system.

10. The method according to claim 1, further comprising the step of:
before generation of the cleaning signal or before movement of the movable contact or before checking of the cleaning parameter, disconnecting the control transformer from an alternating-current power system.

11. An on-load tap changer in a control transformer, the tap changer comprising
a movable contact and a fixed contact;
a contact drive coupled to the movable contact and so constructed that it can rub the movable contact against the fixed contact; and
a controller connected with the contact drive and so constructed that it can
generate a switching signal for actuating the on-load tap changer,
thereafter, as a function of the switching signal check at least one cleaning parameter,
thereafter generate a cleaning signal in dependence on a result of the checking of the one cleaning parameter and transmit the generated cleaning signal to the contact drive,
thereafter rub the contacts together as a function of the cleaning signal, and
thereafter actuate the on-load tap changer as a function of the switching signal.

12. The on-load tap changer according to claim 11, wherein at least one of the cleaning parameters is
a first time period corresponding to how long the movable contact has been conducting current without interruption or

- a second time period corresponding to how long the movable contact has been conducting current since its last cleaning or
- a third time period corresponding to how long the fixed contact has been conducting current without interruption or
- a fourth time period corresponding to how long the fixed contact has been conducting current since its last cleaning or
- a fifth time period corresponding to how long the movable contact has been free of current without interruption or
- a sixth time period corresponding to how long the movable contact has been free of current since its last cleaning or
- a seventh time period corresponding to how long the fixed contact has been free of current without interruption or
- an eighth time period corresponding to how long the fixed contact has been free of current since its last cleaning or
- a ninth time period corresponding to how long the movable contact free of current has contacted the fixed contact without interruption or
- a tenth time period corresponding to how long the movable contact has not contacted the fixed contact or
- a resistance value corresponding to the level of electrical contact resistance between the fixed contact and the movable contact connected therewith.

13. The on-load tap changer according to claim 11, further comprising
- a load changeover switch and a fine selector that comprises the movable contact and the fixed contact, the controller being so constructed that for actuation of the on-load tap changer it
- initially activates the contact drive so as to connect the movable contact with the fixed contact or leave it connected with the fixed contact and
- then activates the load changeover switch in such a way that this switches over.

14. The on-load tap changer according to claim 11, wherein the movable contact or the fixed contact is part of a load selector, fine selector, coarse tap selector, reverser or preselector in the on-load tap changer.

15. The on-load tap changer according to claim 11, wherein the fixed contact is a tap contact or diverter contact.

16. The on-load tap changer according to claim 11, wherein the contact drive is so constructed that it
- cannot separate the movable contact from the fixed contact during the rubbing; or
- can separate the movable contact from the fixed contact at least once before or after the rubbing.

17. The on-load tap changer according to claim 11, wherein the contact drive is so constructed that it can rub the contacts together in such a way that the movable contact separates from the fixed contact at least once.

* * * * *